(12) United States Patent
Ushioda et al.

(10) Patent No.: US 6,441,111 B1
(45) Date of Patent: Aug. 27, 2002

(54) POLYDISPERSE PROPYLENE POLYMER AND PROCESS FOR PRODUCING THE SAME

(75) Inventors: Tsutomu Ushioda; Jun Saito; Mototake Tsutsui; Yoshitoyo Yasuda; Hiroyuki Fujita; Minoru Adachi, all of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/485,617

(22) PCT Filed: Aug. 13, 1998

(86) PCT No.: PCT/JP98/03613

§ 371 (c)(1), (2), (4) Date: Feb. 14, 2000

(87) PCT Pub. No.: WO99/09076

PCT Pub. Date: Feb. 25, 1999

(30) Foreign Application Priority Data

Aug. 15, 1997 (JP) .............................. 9-220334

(51) Int. Cl.$^7$ .......................... C08F 10/08; C08F 4/44; C08F 210/06
(52) U.S. Cl. ...................... 526/160; 526/351; 526/943; 502/152
(58) Field of Search ................... 526/160, 943, 526/348, 348.6, 127, 65, 64, 351; 525/322, 323, 321, 240, 268, 247

(56) References Cited

U.S. PATENT DOCUMENTS

| | | | |
|---|---|---|---|
| 5,296,434 A | | 3/1994 | Karl et al. |
| 5,739,220 A | * | 4/1998 | Shamshoum et al. ......... 526/79 |
| 5,854,354 A | * | 12/1998 | Ueda et al. ................. 525/322 |
| 6,166,153 A | * | 12/2000 | Shamshoum et al. ......... 526/64 |

FOREIGN PATENT DOCUMENTS

| | | |
|---|---|---|
| JP | 61-130314 | 6/1986 |
| JP | 3-12406 | 1/1991 |
| JP | 3-12407 | 1/1991 |
| JP | 3-275703 | 12/1991 |
| JP | 5-43624 | 2/1993 |
| JP | 5-140227 | 6/1993 |
| JP | 6-100579 | 4/1994 |
| JP | 8-53509 | 2/1996 |
| JP | 9-67412 | 3/1997 |
| JP | 9-110934 | 4/1997 |
| WO | 94-116009 | 7/1994 |
| WO | 94/28034 | 12/1994 |

OTHER PUBLICATIONS

"The Influence of Aromatic Substituents on the Polymerization Behavior of Bridged Zirconocene Catalysts", by Spaleck et al., Organometallics 1994, vol. 13, pp. 954–963.

"Mircrostructure of Polypropene Samples Produced with Different Homogeneous Bridged Indenyl Zircomium Catalysts. Clue on the Structure and Reactivity Relation", by Schupfner et al., Journal of Molecular Catalysis A: Chemical 102, 1995, pp. 59–65.

\* cited by examiner

Primary Examiner—David W. Wu
Assistant Examiner—R. Harlan
(74) Attorney, Agent, or Firm—McDermott, Will & Emery

(57) ABSTRACT

A polydisperse propylene polymer characterized by being produced by polymerizing a propylene monomer or a mixed monomer of propylene and other olefin(s) by a multistage polymerization wherein the polymerization conditions are stepwise changed in the presence of a supported metallocene catalyst having a transition metal compound and an aluminoxane or a reaction product thereof supported on a finely particulate support, and an organoaluminum compound as a scavenger, and by having a ratio of a weight-average molecular weight to a number-average molecular weight (Mw/Mn) of 4.0 or higher, a melting point (Tm) of 165° C. or lower and a difference between the melting point (Tm) and a heat distortion temperature (HDT) of 30° C. or less.

3 Claims, 2 Drawing Sheets

POLYDISPERSE PROPYLENE POLYMER AND PROCESS FOR PRODUCING THE SAME

FIELD OF THE INVENTION

This invention relates to a polydisperse propylene polymer which is large in a ratio of a weight-average molecular weight to a number-average molecular weight (Mw/Mn). More particularly, the invention relates to a polydisperse propylene polymer having a low melting point which is suitable for the formation of the products excellent in stiffness and heat resistance, and also a process for producing the same by a multistage polymerization in the presence of a supported metallocene catalyst.

BACKGROUND ART

Propylene polymers have been extensively used in the field of various moldings, because of their good mechanical properties, good chemical resistance and very good balance between their properties and economy. These propylene polymers have been produced by homopolymerization of propylene or copolymerization of propylene and other olefins using a Ziegler-Natta catalyst system comprising an inorganic transition metal catalyst component having titanium trichloride, titanium tetrachloride or the mixture thereof supported on a support such as magnesium chloride, in combination with an organoaluminum compound.

In recent years, processes for the production of olefin polymers have been proposed wherein olefins such as propylene are polymerized using a catalyst comprising an organic complex of a transition metal, so-called metallocene in combination with an aluminoxane, the catalyst being different from a Zigler-Natta catalyst system. For example, JPA 61-130314, JPA 3-12406, JPA 3-12407, JPA 6-100579, U.S. Pat. No. 5,296,434 and Organometallics 13, 957 (1994), etc. disclose metallocene catalysts providing isotactic propylene polymers.

Olefin polymers produced using these metallocene catalysts are generally polymers having a relatively uniform molecular weight wherein a ratio of a weight-average molecular weight to a number-average molecular weight (Mw/Mn) is about 3 or lower. In the production of copolymers, metallocene catalysts can produce more homogeneous olefin copolymers than a supported Ziegler-Natta catalyst system, since comonomers are copolymerized homogeneously.

In general, there is a correlation between the physical properties of propylene polymers, in particular, the stiffness and heat resistance, and the melting point. The Higher melting point indicates the higher stiffness and heat resistance.

On a relationship between a polymerization temperature and a melting point of polypropylene where the catalyst providing an isotactic polypropylene is used, Journal of Molecular Catalysis A: Chemical 102, 59–65 (1995) describes that a high-melting polypropylene is produced, e.g., at 0° C. but the melting point of polypropylene produced at an industrial polymerization temperature, e.g., at 70° C. is extremely low. Organometallics 13, 957 (1994) describes that a high-melting polypropylene is produced even at an industrial polymerization temperature, 70° C. by choice of the species of metallocene compounds in the polymerization in a laboratory scale wherein no catalyst is supported on a support, a so-called homogeneous polymerization.

For the industrial production of propylene polymers, it has been required to use a supported metallocene catalyst wherein a metallocene compound is supported on a support. WO 94/28034 discloses that when propylene is polymerized using a supported catalyst wherein the above metallocene compound providing a high-melting propylene polymer in a high-temperature polymerization is supported on a support, the melting point of the resultant polypropylene lowers as compared with polypropylene produced in a homogeneous polymerization.

Accordingly, it was difficult to industrially produce a high-melting isotactic polypropylene having high stiffness and heat resistance using the supported metallocene catalyst.

JPA 5-140227 discloses a process of producing polyolefins which are large in a ratio of a weight-average molecular weight to a number-average molecular weight using a plurality of metallocene compounds. Also, WO 94/16009 discloses a propylene polymer composition having good mechanical properties which comprises two propylene polymers with different melt flow rates (MFR).

OBJECT OF THE INVENTION

An object of the invention is to provide a propylene polymer giving a molded product which has high stiffness and excellent heat resistance.

Another object of the invention is to provide a process of producing the propylene polymer by a multistage polymerization using a single transition metal compound.

The present inventors have found that a propylene polymer produced by polymerizing propylene by stepwise changing the polymerization conditions in each step in a multistage polymerization using a single transition metal compound exhibits a polydispersity and is excellent in moldability at low temperatures, and the molded articles made therefrom have high stiffness and excellent heat resistance.

SUMMARY OF THE INVENTION

The present invention is directed to a polydisperse propylene polymer characterized by being produced by polymerizing a propylene monomer or a mixed monomer of propylene and other olefin(s) by a multistage polymerization wherein the polymerization conditions are stepwise changed in the presence of a supported metallocene catalyst having a transition metal compound and an aluminoxane or a reaction product thereof supported on a finely particulate support and an organoaluminum compound, and by having a ratio of a weight-average molecular weight to a number-average molecular weight (Mw/Mn) of 4.0 or higher, a melting point (Tm) of 165° C. or lower and a difference between the melting point (Tm) and a heat distortion temperature (HDT) of 30° C. or less.

Another invention is directed to a process of producing the polydisperse propylene polymer, characterized by that a propylene monomer or a mixed monomer of propylene and other olefin(s) is polymerized by a multistage polymerization wherein the polymerization conditions are stepwise changed in the presence of a supported metallocene acatalyst having a transition metal compound and an aluminoxane or a reaction product thereof supported on a finely particulate support and an organoaluminum compound, the transition metal compound being selected from the group consisting of titanocene, zirconocene and hafnocene.

DETAILED DESCRIPTION

The term "multistage polymerization" as used herein means that the polymerization conditions are stepwise changed through the homopolymerization of a propylene monomer or the copolymerization of propylene and other olefin(s). More specifically, it includes stepwise changing a molar ratio of propylene monomer to hydrogen, stepwise changing the polymerization temperature, stepwise changing the polymerization pressure, i.e., a feed rate of monomer and the combination thereof through the polymerization of a propylene monomer or a mixed monomer of propylene with other olefin(s). Further, these conditions may be changed stepwise in a single polymerization reactor, or changed stepwise for each of plural polymerization reactors arranged in series.

The term "propylene polymer" as used herein means a propylene homopolymer, a random and block copolymer of propylene and other olefin(s) than propylene which contains 50% by weight or more of propylene units.

Other olefins than propylene which are copolymerizable with propylene include, but not limited to, olefins of 2–12 carbons, e.g., ethylene, 1-butene, 1-pentene, 1-hexene, 1-octene, 1-decene, 4-methyl-1-pentene and 3-methyl-1-pentene, and the mixture thereof. These are preferably used. In addition to these olefins, small amounts of $\alpha,\omega$-dienes such as 1,5-hexadiene and 1,9-decadiene, may be copolymerized, if desired.

The term "polydispersity" as used herein means that the molecular weight of the polymer is not uniform. Such a term "polydispersity" is used for a propylene polymer having a molecular weight distribution width (Mw/Mn) of 4.0 or higher wherein Mw is a weight-average molecular weight and Mn is a number-average molecular weight.

Figure 1:
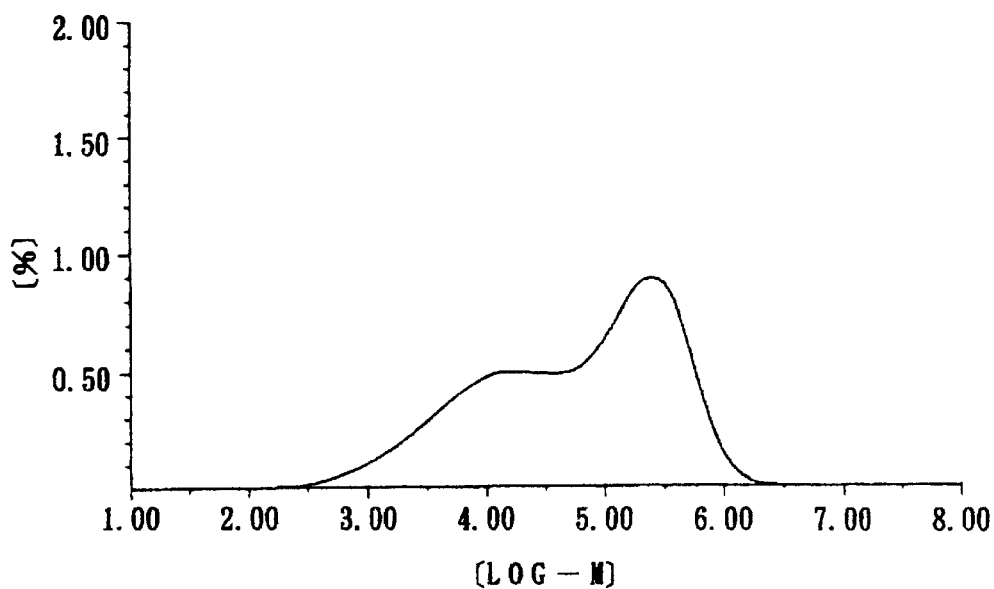
FIG. 1 is GPC curve showing a molecular weight distribution of the propylene homopolymer produced in Example 1.

The propylene polymer of the present invention is a polydisperse propylene polymer wherein a ratio of a weight-average molecular weight to a number-average molecular weight (Mw/Mn), which is calculated from the molecular weight distribution determined by GPC (gel permeation chromatography) in FIG. 1, is 4.0 or higher, preferably 10 or higher, and more preferably 15 or higher.

A ratio of a weight-average molecular weight to a number-average molecular weight (Mw/Mn) is a value calculated from the weight-average molecular weight (Mw) and the number-average molecular weight (Mn) which are determined at 135° C. by placing a mixed polystyrene gel column (e.g., PSKgel GMH6-HT manufactured by Toso K. K.) in GPC (GPC-150C manufactured by Waters Co., Ltd.) and feeding a solution of 0.05% by weight of the polymer in o-dichlorobenzene thereto at a flow rate of 1.0 ml/min.

The polydisperse propylene polymer has also a melting point (Tm) of 165° C. or lower, preferably 150° C. or lower, more preferably 148.5° C. or lower, and has a difference between the melting point (Tm) and a heat distortion temperature (HDT) determined at a load of 0.451 MPa in accordance with JIS K7207 of 30° C. or less, preferably 28° C. or less, most preferably about 25° C. or less. Further, it has a mechanical property exhibiting a ratio of a flexural modulus to a melting point (Tm) of 9 or higher, said modulus being determined in accordance with JIS K7203.

The heat distortion temperature (HDT) of preferred propylene homopolymer is 118° C. or higher, preferably 120° C. or higher, more preferably about 122° C., and the flexural modulus is at least 1,300 MPa, preferably 1,400 MPa or higher.

The melting point (Tm) of the propylene polymer is a value wherein a temperature showing a peak on melting was determined by elevating the temperature of the propylene polymer from room temperature to 230° C. at a rate of 30° C./min, keeping it at the same temperature for 10 minutes, followed by lowering it to –20° C. at a rate of 20° C./min and keeping it at the same temperature for further 10 minutes and elevating it again at a rate of 20° C./min, using a differential scanning calorimeter (DCS 7 type manufactured by Perkin Elmer Co., Ltd.).

The heat distortion temperature (HDT) and the flexural modulus are values measured using a JIS type test piece which was prepared by mixing 100 parts by weight of the propylene polymer with 0.05 part by weight of tetraxis [methylene(3,5-di-t-butyl-4-hydroxyl-hydrocinnamate)] methane, 0.1 part by weight of tris(2,4-di-t-butylphenyl) phosphite and 0.1 part by weight of calcium stearate, forming the mixture into pellets using a single screw extruder with a screw diameter of 40 mm set at an extrusion temperature of 230° C. and injection-molding the propylene polymer pellets at a melt resin temperature of 250° C. and a mold temperature of 50° C. using an injection molding machine with a screw diameter of 40 mm.

The propylene polymers of the present invention can be produced by polymerizing a propylene monomer or a mixed monomer of propylene and other olefin(s) by a multistage polymerization wherein the polymerization conditions are stepwise changed in the presence of a supported metallocene catalyst having a transition metal compound and an aluminoxane or a reaction product thereof supported on a finely particulate support, and an organoaluminum compound, the transition metal compound being selected from the group consisting of titanocene, zirconocene and hafnocene.

The supported metallocene catalyst is the catalyst wherein the transition metal compound selected from the group consisting of titanocene, zirconocene and hafnocene and also an aluminoxane are supported on a finely particulate support.

The transition metal compound is represented by the following formula

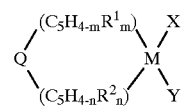

wherein

M represents a transition metal atom selected from the group consisting of titanium, zirconium and hafnium;

X and Y may be the same or different and each represents a hydrogen atom, a halogen atom or a hydrocarbyl radical;

$(C_5H_{4-m}R^1_m)$ and $(C_5H_{4-n}R^2_n)$ represent a substituted cyclopentadienyl group in which m and n are an integer of 1–3, and $R^1$ and $R^2$ may be the same or different and each represents a hydrocarbyl radical of 1 to 20 carbons, a silicone-containing hydrocarbyl radical or a hydrocarbyl radical forming a ring joined with adjacent two carbon atoms on the cyclopentadienyl ring; and Q represents a divalent hydrocarbyl radical, an unsubstituted silylene group or a hydrocarbyl-substituted silylene group.

The hydrocarbyl radicals represented by X and Y include, for example, chain or cyclic alkyl groups of 1–20 carbons, unsubstituted or substituted aryl groups, unsubstituted or substituted aralkyl groups, alkoxy groups, aryloxy groups, and halogenated hydrocarbyl radicals wherein a part or all of the hydrogen atoms are substituted by a halogen atom.

The hydrocarbyl radicals of 1 to 20 carbons represented by $R^1$ and $R^2$ are the same groups as recited above. The silicone-containing hydrocarbyl radicals include, for example, a trialkylsilyl group, a triarylsilyl group, an alkylarylsilyl group, a trialkylsilylalkyl group, a trialkylsilylaryl group, a trialkylsilyloxy group and the like. The hydrocarbyl radical which forms a ring together with adjacent two carbon atoms on the cyclopentadienyl ring is, for example, a divalent hydrocarbyl radical which is joined with a cyclopentadienyl ring to form an indenyl group or a fluorenyl group, and the divalent hydrocarbyl radical may be substituted with a halogen atom, the above hydrocarbyl radical or the above silicone-containing hydrocarbyl radical.

The divalent groups represented by Q include, for example, a straight- or branched-chain alkylene group, a substituted or unsubstituted cycloalkylene group, an alkylidene group, a substituted or unsubstituted cycloalkylidene group, a substituted or unsubstituted phenylene group, and the like, and a part or all of the hydrogen atoms in these groups may be further substituted with a halogen atom. The hydrocarbon-substituted silylene groups include those substituted by the above hydrocarbyl radical, e.g., dialkylsilylene, diarylsilylene, etc.

Preferably, the position of $R^1$ and $R^2$ on the cyclopentadienyl ring gives a configuration wherein any symmetry plane containing M each other is absent. More preferably, at least one of $R^1$ and $R^2$ substitutes a carbon adjacent to the carbon attached to Q on the cyclopentadienyl ring.

Most preferably, the above transition metal compound is a compound of 100% racemic form which is chiral with respect to two substituted cyclopentadienyl groups, but it may be a mixture of a racemic form and a meso form in which there is present a meso form in the range of 50% or lower not impairing the physical properties of the resulting propylene polymer.

Concrete transition metal compounds of the recemic form include, for example, titanocenes, zirconocenes and hafnocenes such as dimethylsilylene(2,3,5-trimethylcyclopentadienyl) (2',4',5'-trimethylcyclopentadienyl)titanium dichloride, dimethylsilylene(2,3,5-trimethylcyclopentadienyl) (2',4',5'-trimethylcyclopentadienyl)zirconium dichloride, dimethylsilylene(2,3,5-trimethylcyclopentadienyl) (2',4',5'-trimethylcyclopentadienyl)zirconium dimethyl, dimethylsilylene(2,3,5-trimethylcyclopentadienyl)-(2',4',5'-trimethylcyclopentadienyl)hafnium dichloride, dimethylsilylene(2,3,5-trimethylcyclopentadienyl)(2',4',5'-trimethylcyclopentadienyl) hafnium dimethyl, dimethylsilylene bis(2-methyl-4-phenylindenyl)zirconium dichloride, dimethylsilylene bis(2-ethyl-4-phenylindenyl)zirconium dichloride, dimethylsilylene bis(2-methyl-4,5-benzoindenyl)-zirconium dichloride and the like. In particular, dimethylsilylene(2,3,5-trimethylcyclopentadienyl) (2',4',5'-trimethylcyclopentadienyl)zirconium dichloride and dimethylsilylene bis(2-methyl-4-phenylindenyl)zirconium dichloride are preferably used.

The aluminoxane is an organoaluminum compound represented by the following formula (1) or (2).

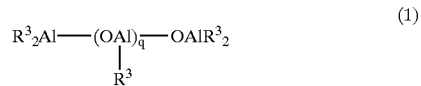

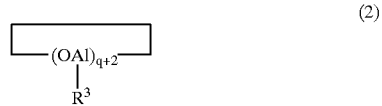

wherein $R^3$ may be the same or different and each is a hydrocarbyl radical of 1 to 6 carbons, preferably 1 to 4 carbons, e.g., an alkyl group such as methyl, ethyl, propyl, butyl, isobutyl, pentyl, hexyl, etc.; an alkenyl group such as allyl, 2-methylallyl, propenyl, isopropenyl, 2-methyl-1-propenyl, butenyl, etc.; a cycloalkyl group such as cyclopropyl, cyclobutyl, cyclopentyl, cyclohexyl, etc.; and an aryl group, etc. In particular, the alkyl group is preferable. q is an integer of 4 to 30, preferably 6 to 30, and especially preferably 8 to 30.

The above-mentioned aluminoxanes may use commercially available products, and also they may be prepared under known various conditions, for example, by the following methods.

i) A method of reacting a trialkyl aluminum, e.g., trimethyl aluminum, triisobutyl aluminum or the mixture thereof, directly with water in an organic solvent such as toluene, ether, etc., in the presence of an acid or alkali catalyst;

ii) A method of reacting a trialkyl aluminum, e.g., trimethyl aluminum, triisobutyl aluminum or the mixture thereof, with salts containing crystal water, e.g., copper sulfate hydrate and aluminum sulfate hydrate; and iii) A method of reacting water impregnated in silica gel or the like, with a trialkyl aluminum, e.g., trimethyl aluminum or triisobutyl aluminum, separately or simultaneously or successively.

As the finely particulate supports on which the transition metal compound and aluminoxane or the reaction product thereof are supported, granulate or spherical, inorganic or organic solid fine particles having a particle diameter of 1 to 500 μm, preferably 5 to 300 μm are used.

For the inorganic finely particulate supports, metal oxides, e.g., $SiO_2$, $Al_2O_3$, MgO, $ZrO_2$, $TiO_2$ and the mixture thereof or the composite oxides thereof are preferable. The oxides comprising as a main component at least one selected from the group consisting of $SiO_2$, $Al_2O_3$ and MgO are especially preferable. More specifically, the inorganic compounds include $SiO_2$, $Al_2O_3$, MgO, $SiO_2$—$Al_2O_3$, $SiO_2$—MgO, $SiO_2$—$TiO_2$, $SiO_2$—$Al_2O_3$—MgO, etc. These inorganic oxide supports are used after fired usually at a temperature of 100 to 1000° C. for 1 to 40 hours. Instead of firing, they may be used after chemically dehydrated, e.g., with $SiCl_4$, chlorosilane, etc.

The organic finely particulate supports include polymer fine particles such as olefin polymer fine particles, e.g., polyethylene, polypropylene, poly(1-butene), poly(4-methyl-1-pentene), polystyrene fine particles, etc.

The supported metallocene catalyst can be prepared by reacting the transition metal compound with aluminoxane in the presence of the finely particulate support. In general, the desired, supported metallocene catalysts are prepared by depositing a transition metal compound and aluminoxane soluble in a hydrocarbon on a dehydrated finely particulate support. The order of adding the transition metal compound and aluminoxane to the finely particulate support can be varied arbitrarily. Any of the following methods may be employed, for instance, a method of initially adding a solution of a transition metal compound dissolved in a suitable hydrocarbon solvent to a finely particulate support and subsequently adding aluminoxane; a method of adding a reaction product of a transition metal compound and aluminoxane to a finely particulate support; and a method of initially adding aluminoxane to a finely particulate support, followed by adding a transition metal compound.

The reaction conditions include the reaction temperature of usually −20 to 100° C., preferably 0 to 100° C. and the reaction time of usually 0.1 minute or longer, and preferably 1 to 200 minutes.

A ratio of the transition metal compound to aluminoxane supported on the finely particulate support is 12 to 1000 mols, preferably 50 to 500 mols in terms of Al atom derived from aluminoxane, per mol of a transition metal atom derived from the transition metal compound.

The supported metallocene catalyst as prepared above is preferably used after it has been pre-activated by prepolymerizinq small amounts of olefins on the supported metallocene catalyst, prior to the polymerization of olefins. The olefins used for the preactivation include ethylene, propylene, 1-butene, 1-hexene, 3-methyl-1-butene, 4-methyl-1-pentene, etc. and the mixture thereof. Ethylene or propylene is preferably used.

The polymerization amount of olefins for the preactivation of the supported metallocene catalyst is usually 10 to 1000 wt %, preferably 30 to 300 wt %, more preferably 30 to 100 wt %, based on the supported metallocene catalyst before preactivation.

The organoaluminum compound is used as a scavenger. Such organoaluminum compounds include, e.g., trialkylaluminum such as trimethylaluminum, triethylaluminum, tri-n-propylaluminum, tri-isopropylaluminum, tri-isobutylaluminum and tri-n-butylaluminum; dialkylaluminum halides such as dimethylaluminum chloride, dimethylaluminum bromide, diethylaluminum chloride and di-isopropylaluminum chloride; alkylaluminum sesquihalides such as methylaluminum sesquichloride, ethylaluminum sesquichloride, ethylaluminum sesquibromide and isopropylaluminum sesquichloride; and the mixtures thereof. Triethylaluminum and tri-isobutylaluminum are most preferably used.

The propylene polymers of the present invention are produced by a multistage polymerization wherein the polymerization conditions are changed in two or more steps. To the polymerization condition and process in each step, each of the following polymerization processes and conditions is applied-separately.

As the polymerization processes, any of usual propylene polymerization processes can be employed, for example, a slurry polymerization process wherein olefins are polymerized in an inert solvent including an aliphatic hydrocarbon such as butane, pentane, hexane, heptane and isooctane, an alicyclic hydrocarbon such as cyclopentane, cyclohexane and methylcyclohexane, an aromatic hydrocarbon such as toluene, xylene and ethylbenzene, gasoline fraction, and hydrogenated diesel oil; a bulk polymerization process wherein olefin monomers per se are used as a solvent; a gas phase polymerization process wherein the polymerization is performed in a gas phase; a solution polymerization process wherein the polymer produced by polymerization is liquid; and a combination of these polymerization processes.

As the polymerization conditions of propylene, the same conditions as in the polymerization of propylene using known supported Ziegler-Natta catalyst are usually employed. More specifically, olefins are fed so that the polymerization pressure is kept at a pressure ranging from an atmospheric pressure to 7 MPa, preferably 0.2 to 5 MPa at a polymerization temperature of 30 to 150° C., preferably 40 to 100° C., and the reaction is usually carried out for one minute to 20 hrs.

The weight-average molecular weight (Mw), the number-average molecular weight (Mn) and the ratio thereof (Mw/Mn) of the resulting propylene polymer are controlled by stepwise changing the selected polymerization conditions.

Most preferably, a method is employed wherein the weight-average molecular weight/the number-average molecular weight ratio of the resulting propylene polymer is controlled by changing the concentration or amount of hydrogen which is a chain transfer agent used in each step, i.e., a molar ratio of propylene monomer/hydrogen, thereby changing the molecular weight of the propylene polymer polymerizing in each polymerization step.

In this method, the weight-average molecular weight/the number-average molecular weight ratio (Mw/Mn) of the propylene polymer is controlled to 4.0 or higher by stepwise changing the molar ratio of propylene monomer/hydrogen within the range of usually $10^{-5}$ to 1.0, preferably $10^{-4}$ to 0.5.

After the polymerization reaction of the propylene polymer is completed, in the present invention, the intended polydisperse propylene polymers are obtained through known after-treatment steps such as the steps of deactivating the catalyst, removing the catalyst residue and drying, as the occasion demands.

The resultant propylene polymer is compounded with various additive components in the range not impairing the object of the present invention, and the compound is heated and melt-kneaded, then cut in particulate form into pellets which are provided for the manufacture of various molded articles.

The additive components for the propylene polymer include various additives such as antioxidants, ultraviolet absorbing agents, antistatic agents, nucleating agents, lubricants, flame retardants, antiblocking agents, colorants, inorganic or organic fillers, etc., and various synthetic resins.

EXAMPLE

The invention is further illustrated by the following Examples and Comparative Examples, in which the following physical properties were determined, in addition to the above-mentioned properties. Melt flow rate (MFR): Determined at a load of 21.18N and a temperature of 230° C. in accordance with condition 14 in Table 1 of JIS K7210 (unit: g/10 min) Crystallization temperature (Tc) (unit: ° C.): A temperature showing a peak on crystallizing which was determined by elevating the temperature of polypropylene from room temperature to 230° C. at a rate of 30° C./min, keeping it at the same temperature for 10 minutes, followed by lowering it to −20° C. at a rate of 20° C./min and keeping it at the same temperature for further 10 minutes, elevating it again to 230° C. at a rate of 20° C./min and keeping it at the same temperature for 10 minutes, and thereafter lowering it to 150° C. at a rate of 80° C./min, and further lowering it from 150° C. at a rate of 5° C./min, using a differential scanning calorimeter (DCS 7 type manufactured by Perkin Elmer Co., Ltd.).

Example 1

A. Preparation of Supported Metallocene Catalyst

A sufficiently dried 500 ml flask purged with nitrogen was charged with 0.38 g (0.52 mmol) of dimethylsilylene bis(2- methyl-4-phenylindenyl)zirconium dichloride (rac: meso molar ratio=96:4) and 286 mmol (in terms of Al atom) of a toluene diluted product of methylaluminoxane, and the mixture was reacted for 10 minutues. To this reaction system was added 10 g of silica (Grace Devison®) which was fired at 800° C. for 8 hrs and the mixture was stirred for 10 minutes. Subsequently, a slight flow of $N_2$ was added through the bottom of the flask while evacuating the flask under reduced pressure, and the mixture was heated at 70° C. for 9 hrs while evaporating the solvent. The resultant dry solid was cooled to ambient temperature overnight to afford a supported metallocene catalyst.

A sufficiently dried 500 ml flask purged with nitrogen was charged with the supported metallocene catalyst as prepared above and 250 ml of isopentane, and the mixture was cooled to 0° C. Then, prepolymerization was carried out by continuously feeding ethylene at a feed rate of 80 ml/min for 4 hrs to preactivate the supported metallocene catalyst. Thereafter, the supernatant was separated by decantation and the catalyst was washed four times with additional 100 ml of isopentane by a decantation method. Vacuum drying at ambient temperature for 2 hrs gave 34.4 g of the preactivated, supported metallocene catalyst.

B. Production of Propylene Polymer

A 100 L autoclave sufficiently purged with nitrogen was charged with 33 L of n-hexane and 66 mmol of triethylaluminum, and the mixture was stirred for 5 minutes. 6.6 g of the preactivated, supported metallocene catalyst as prepared above were added and the temperature of the mixture was elevated to 50° C. Subsequently, 0.05 mol of $H_2$ was introduced and propylene monomer was continuously fed so as to maintain a constant pressure of 1.08 MPa at 50° C. to carry out a polymerization for 240 minutes. A molar ratio of propylene monomer to hydrogen during this process was $4 \times 10^{-3}$. Subsequently, 1.36 mol of $H_2$ was further introduced to change the molar ratio of propylene monomer to hydrogen, and a propylene monomer was fed so as to maintain the above-mentioned temperature and pressure conditions to continue the polymerization for 210 minutes. A molar ratio of propylene monomer to hydrogen during this process was 0.11. The resultant slurry was filtered and dried to obtain 6.6 kg of a propylene homopolymer.

The results of the physical properties determined for the resultant propylene homopolymer are shown below.

The ratio of a weight-average molecular weight to a number-average molecular weight (Mw/Mn) was 16.4, the melting point (Tm) was 147.1° C., the heat distortion temperature (HDT) was 122° C., the melt flow rate (MFR) was 26.0 g/10 min, the crystallization temperature (Tc) was 110.2° C. and the flexural modulus was 1410 MPa.

Thus, the difference between Tm and HDT was calculated as 27.1° C. and the ratio of the flexural modulus to Tm was calculated as 9.58.

The molecular weight distribution curve by GPC of the resultant propylene homopolymer is shown in FIG. 1.

Example 2

Production of Propylene/ethylene Copolymer

Polymerization was carried out under the same condition as in Example 1, except that an ethylene monomer was continuously fed at a rate of 30 L/hr upon the former polymerization of the propylene monomer for 240 minutes and upon the latter polymerization for 210 minutes, respectively. Subsequently, the same after-treatment as in Example 1 gave 6.5 kg of the propylene/ethylene copolymer.

The results of the physical properties determined for the resultant propylene/ethylene copolymer are shown below. The ratio of a weight-average molecular weight to a number-average molecular weight (Mw/Mn) was 17.5, the melting point (Tm) was 138.0° C. the heat distortion temperature (HDT) was 111° C., the melt flow rate (MFR) was 30.0 g/10 min, the crystallization temperature (Tc) was 100.2° C. and the flexural modulus was 1250 MPa.

Thus, the difference between Tm and HDT was calculated as 27° C. and the ratio of the flexural modulus to Tm was calculated as 9.06.

Comparative Example 1

A 100 L autoclave sufficiently purged with nitrogen was charged with 33 L of n-hexane and 66 mmol of triethylaluminum, and the mixture was stirred for 5 minutes. 13 g of the supported metallocene catalyst prepared in Example 1 were added and the temperature of the mixture was elevated to 50° C. Subsequently, 0.33 mol of $H_2$ was introduced and propylene monomer was continuously fed so as to maintain a constant pressure of 1.08 MPa at 50° C. to carry out a polymerization for 180 minutes. The molar ratio of propylene monomer to hydrogen during this process was 0.026. The resultant slurry was filtered and dried to obtain 6.6 kg of a propylene homopolymer.

The results of the physical properties determined for the resultant propylene homopolymer are shown below. The ratio of a weight-average molecular weight to a number-average molecular weight (Mw/Mn) was 3.7, the melting point (Tm) was 148.5° C., the heat distortion temperature (HDT) was 117° C., the melt flow rate (MFR) was 17.3 g/10 min, the crystallization temperature (Tc) was 110.4° C. and the flexural modulus was 1260 MPa.

Thus, the difference between Tm and HDT was calculated as 31.5° C. and the ratio of the flexural modulus to Tm was calculated as 8.48.

Figure 2:
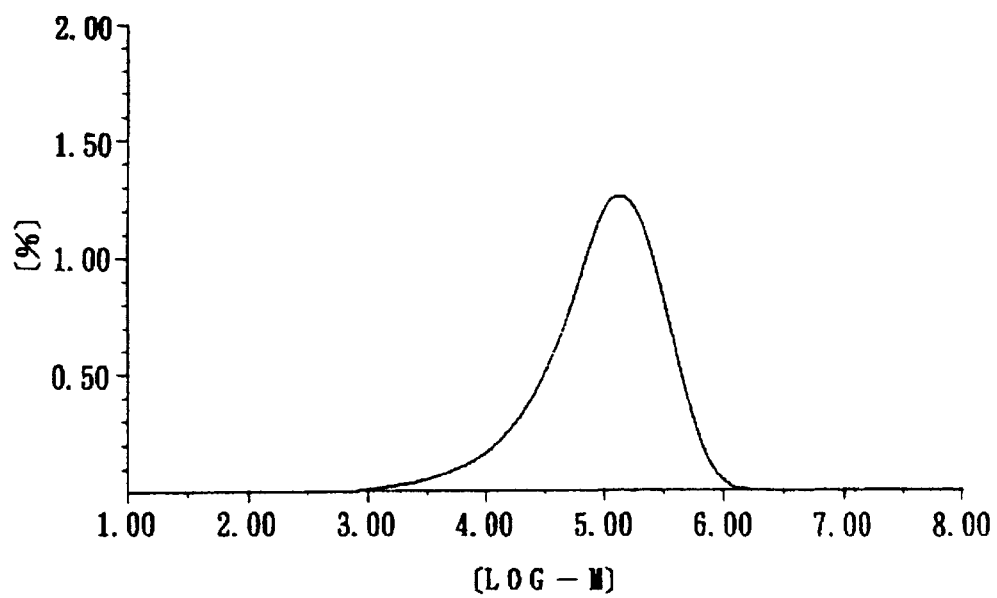
FIG. 2 is GPC curve showing a molecular weight distribution of the propylene homopolymer produced in Comparative Example 1.

The molecular weight distribution curve by GPC of the resultant propylene homopolymer is shown in FIG. 2.

Comparative Example 2

A commercially available homopolypropylene (trade name: Acheive® 3825 manufactured by Exxon Chemical Co., Ltd.) produced using known metallocene catalyst was determined for the physical properties with the following results. The ratio of a weight-average molecular weight to a number-average molecular weight ratio (Mw/Mn) was 1.95, the melting point (Tm) was 148.9° C., the heat distortion temperature (HDT) was 112° C., the melt flow rate (MFR) was 28 g/10 min, the crystallization temperature (Tc) was 110.4° C. and the flexural modulus was 1140 MPa.

Thus, the difference between Tm and HDT was calculated as 36.9° C. and the ratio of the flexural modulus to Tm was calculated as 7.66.

Figure 3:
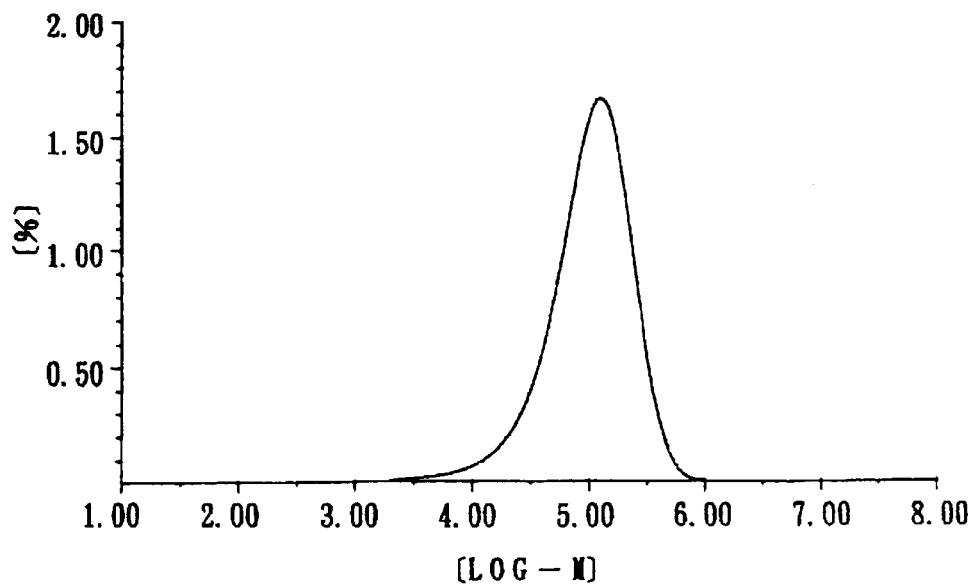
FIG. 3 is GPC curve showing a molecular weight distribution of a commercially available propylene homopolymer produced in Comparative Example 2.
Figure 4:
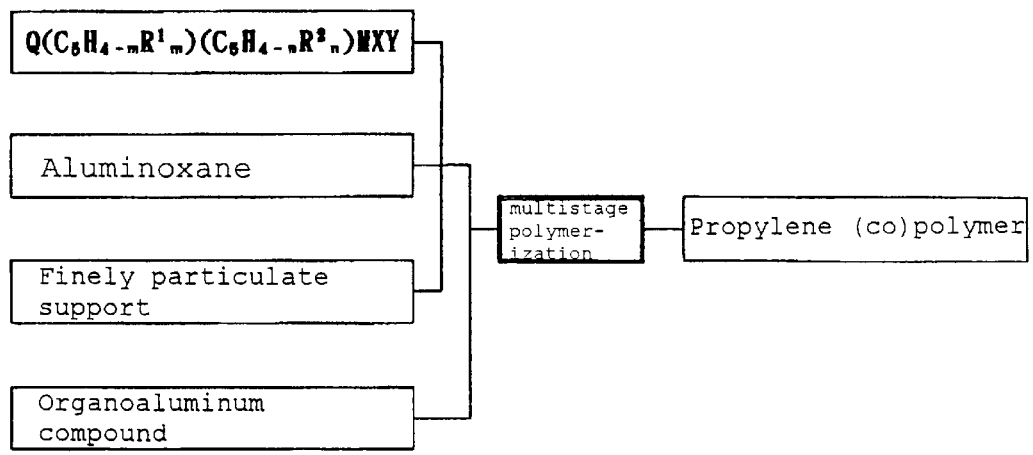
FIG. 4 is a flow sheet of the process for the production of the propylene polymer according to the present invention.

The molecular weight distribution curve by GPC of the commercially available propylene polymer is shown in FIG. 3.

EFFECT OF THE INVENTION

As shown in the above Examples, the polydisperse propylene polymers of the present invention have low melting points, therefore being excellent in moldability at low temperatures. They can also reduce a heat-sealing temperature when applied to films or the like. Further, the products molded from the polydisperse propylene polymers have high stiffness and heat resistance.

Accordingly, the polydisperse propylene polymers of the present invention can be used as a molding propylene polymer suitably for various molded articles.

Further, the process for the production of the propylene polymer according to the present invention is a multistage polymerization wherein the polymerization is conditions are stepwise changed in a simple manner through the polymerization and the process steps are rationalized drastically.

What is claimed is:

1. A process of producing a polydisperse propylene polymer having a ratio of a weight-average molecular weight to a number-average molecular weight (Mw/Mn) of 4.0 or higher, a melting point (Tm) of 165° C. or lower, and a difference between the melting point (Tm) and a heat distortion temperature (HDT) of 30° C. or less, characterized by polymerizing a propylene monomer or a mixed monomer of propylene and other olefin(s) by a multistage polymerization wherein the polymerization conditions are changed stepwise in the presence of a supported metallocene catalyst having a transition metal compound and an aluminoxane or a reaction product thereof supported on a finely particulate support, and an organoaluminum compound, wherein the transition metal compound is selected from the group consisting of dimethylsilylene(2,3,5-trimethylcyclopentadienyl)(2',4',5'-trimethylcyclopenta-dienyl) zirconium dichloride, dimethylsilylene bis (2-methyl-4-phenylindenyl) zirconium dichloride and dimethylsilylene bis(2-methyl-4,5-benzoindenyl)zirconium dichloride which may contain the meso form thereof.

2. A process of producing a polydisperse propylene polymer having a ratio of a weight-average molecular weight to a number-average molecular weight (Mw/Mn) of 4.0 or higher, a melting point (Tm) of 165° C. or lower, and a difference between the melting point (Tm) and a heat distortion temperature (HDT) of 30° C. or less, characterized by polymerizing a propylene monomer or a mixed monomer of propylene and other olefin(s) by a multistage polymerization wherein the polymerization conditions are changed stepwise such that respective polymerization conditions are set for each of plural polymerization reactors arranged in series in the presence of a supported metallocene catalyst having a transition metal compound and an aluminoxane or a reaction product thereof supported on a finely particulate support, and an organoaluminum, compound, the transition metal compound being selected from the group consisting of titanocene, zirconocene and hafnocene.

3. The process of claim 2, wherein the transition metal compound is selected from the group consisting of dimethylsilylene (2,3,5-trimethylcyclopentadienyl) (2',4',5'-trimethylcyclopentadienyl) zirconium dichloride, dimethylsilylene bis (2-methyl-4-phenylindenyl) zirconium dichloride and dimethylsilylene bis (2-methyl-4,5-benzoindenyl) zirconium dichloride which may contain the meso form thereof.

* * * * *